United States Patent
Ramamurthy et al.

(10) Patent No.: US 7,437,874 B2
(45) Date of Patent: Oct. 21, 2008

(54) SYSTEM AND METHOD FOR BACKPRESSURE COMPENSATION FOR CONTROLLING EXHAUST GAS PARTICULATE EMISSIONS

(75) Inventors: Ravishankar Ramamurthy, Westland, MI (US); Laurentiu Vaduva, Harper Woods, MI (US); Admir Krejo, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 467 days.

(21) Appl. No.: 11/076,718

(22) Filed: Mar. 10, 2005
(Under 37 CFR 1.47)

(65) Prior Publication Data
US 2006/0288701 A1 Dec. 28, 2006

(51) Int. Cl.
| | |
|---|---|
| F02D 23/00 | (2006.01) |
| F02B 33/44 | (2006.01) |
| F01N 3/00 | (2006.01) |
| F01N 3/10 | (2006.01) |
| F02M 25/07 | (2006.01) |
| G06F 17/00 | (2006.01) |
| G06F 19/00 | (2006.01) |

(52) U.S. Cl. ............ 60/602; 60/605.1; 60/605.2; 60/285; 60/286; 60/297; 701/108; 701/110; 701/114

(58) Field of Classification Search ........... 60/600–603, 60/605.1, 605.2, 285, 286, 197; 701/108, 701/110, 114
See application file for complete search history.

(56) References Cited

U.S. PATENT DOCUMENTS

| | | | |
|---|---|---|---|
| 5,377,651 A | 1/1995 | Sezomak et al. ........ 123/568.28 |
| 6,050,093 A * | 4/2000 | Daudel et al. ................ 60/602 |
| 6,058,707 A * | 5/2000 | Bischoff ....................... 60/602 |
| 6,067,800 A * | 5/2000 | Kolmanovsky et al. ........ 60/602 |
| 6,095,127 A * | 8/2000 | Kolmanovsky et al. ..... 701/108 |
| 6,209,530 B1 | 4/2001 | Faletti et al. ............... 60/605.2 |
| 6,311,494 B2 | 11/2001 | McKinley et al. |
| 6,347,619 B1 | 2/2002 | Whiting et al. |
| 6,497,095 B2 | 12/2002 | Carberry et al. .............. 60/286 |
| 6,598,387 B2 | 7/2003 | Carberry et al. .............. 60/286 |
| 6,604,361 B2 * | 8/2003 | Buckland et al. .......... 60/605.2 |
| 6,662,562 B2 * | 12/2003 | Engel et al. ................... 60/602 |
| 6,708,104 B2 | 3/2004 | Avery, Jr. et al. ............ 701/110 |
| 6,718,767 B1 * | 4/2004 | Caddy ......................... 60/602 |
| 6,883,318 B2 * | 4/2005 | Warner et al. ................ 60/602 |
| 6,973,785 B2 * | 12/2005 | Umehara et al. .......... 60/605.2 |
| 7,016,779 B2 * | 3/2006 | Bowyer ..................... 701/108 |
| 7,155,334 B1 * | 12/2006 | Stewart et al. ............. 701/114 |
| 7,165,399 B2 * | 1/2007 | Stewart ....................... 60/602 |
| 2006/0021344 A1 * | 2/2006 | Barba et al. ............... 60/605.2 |

FOREIGN PATENT DOCUMENTS

EP 1574691 A2 * 9/2005

* cited by examiner

Primary Examiner—Thai-Ba Trieu
(74) Attorney, Agent, or Firm—Brooks Kushman P.C.

(57) ABSTRACT

A method for controlling exhaust gas particulate emissions from a compression ignition internal combustion engine having a variable geometry turbocharger (VGT) includes the steps of determining backpressure across the engine and air mass flow into the engine, closing vanes of the VGT to provide air mass flow increase when backpressure is increasing, and stopping the step of closing the vanes of the VGT when a decrease in rate of change of air mass flow is determined.

20 Claims, 2 Drawing Sheets

SYSTEM AND METHOD FOR BACKPRESSURE COMPENSATION FOR CONTROLLING EXHAUST GAS PARTICULATE EMISSIONS

BACKGROUND OF THE INVENTION

1. Field of the Invention

The present invention relates to a system and a method for controlling exhaust gas particulate emissions from a compression ignition internal combustion engine.

2. Background Art

Internal combustion engines, and in particular, compression ignition (or diesel) engines have a wide variety of applications including passenger vehicles, marine vessels, earth-moving and construction equipment, stationary generators, and on-highway trucks, among others. Diesel particulate trap or filter (DPFs) have been introduced into the exhaust systems for compression ignition internal combustion engines to reduce particulate emissions (PMs) that are emitted by the engine. Improved systems and methods of reducing PMs are desirable for compression ignition internal combustion engines to meet increasingly stringent emissions standards.

A DPF is an emission control device placed in the exhaust stream to reduce PMs, which are primarily carbon particles or soot. Performance of the engine in terms of drivability and fuel economy is related, in part, to pressure drop across the DPF and backpressure generated due to the DPF. As particulates accumulate in the DPF, an increasing restriction to exhaust flow results. Pressure drop across the DPF typically increases as soot accumulates in the DPF. The increasing restriction causes a gradual increase in exhaust (or engine) backpressure (i.e., the pressure within the exhaust upstream of the DPF) causing reduced engine performance. When the DPF is not properly maintained or when engine conditions prevent the DPF from being regenerated, the exhaust backpressure can increase to a point where engine component life can be jeopardized.

Further, exhaust gas recirculation (EGR) systems have been introduced into internal combustion engines. EGR systems recirculate exhaust into the intake air stream of the engine, thereby reducing oxides of nitrogen (NOx) emissions that are formed when temperatures in the combustion chamber of the engine become elevated to a temperature higher than is desirable. Compression ignition engines are often turbocharged. The turbocharger may be implemented as a variable geometry device (VGT, also called variable turbine geometry (VTG)). The VGT has movable turbine vanes (or blades) that pivot to adjust turbocharger generated intake air boost pressure in response to engine speed and load. Cross-sectional changes are made by resetting the turbine blades (e.g., smaller contact surface at low speeds, larger contact surface at high speeds). VTG turbochargers may be particularly efficient at partial load and generally reduce or eliminate "turbo lag" thereby improving drivability. VTG turbochargers can increase effective engine power, increase throttle response and can also have a beneficial effect on particulate emissions.

Compression ignition engines that implement an EGR approach to reducing NOx emissions typically also utilize a VGT to aid in the generation of proper backpressure levels to operate the EGR system. The set of vanes in the VGT closes to generate the backpressure to provide EGR operation. Air mass flow through the engine typically increases non-linearly in response to VGT vane closure. The non-linear air mass flow through the engine can have a "bell-shaped" curve. As such, air mass flow can start to decrease beyond a given level of VGT vane closure because the VGT turbine efficiency starts to decrease and backpressure starts to increase. As a result, soot accumulation in the DPF is accentuated due to the decrease in air flow. A spiraling of black smoke from the engine exhaust and failure of the DPF can result.

Thus, there exists a need and an opportunity for an improved system and an improved method for controlling exhaust gas particulate emissions from a compression ignition internal combustion engine.

SUMMARY OF THE INVENTION

The present invention generally provides new, improved and innovative techniques for controlling exhaust gas particulate emissions from a compression ignition internal combustion engine. The present invention generally implements backpressure compensation.

According to the present invention, a method for controlling exhaust gas particulate emissions from a compression ignition internal combustion engine having a variable geometry turbocharger (VGT) is provided. The method comprises the steps of determining backpressure across the engine and air mass flow into the engine, closing vanes of the VGT to provide air mass flow increase when backpressure is increasing, and stopping the step of closing the vanes of the VGT when a decrease in rate of change of air mass flow is determined.

The VGT vanes are closed to compensate for the loss of air mass flow with increase in backpressure. The VGT vanes closure stops when the rate of change of airflow is decreasing, thereby avoiding unnecessary over closure and increase in turbo speed.

Also according to the present invention, a system for controlling exhaust gas particulate emissions from a compression ignition internal combustion engine is provided. The system comprises a variable geometry turbocharger (VGT) installed on the engine and having an actuator configured to continuously adjust turbine vanes in the VGT in real-time in response to a VGT control signal, an exhaust gas recirculation (EGR) valve installed on the engine and having an actuator configured to continuously adjust the EGR valve in real-time in response to an EGR control signal, a first sensor for determining backpressure across the engine, a second sensor for determining air mass flow into the engine, and an engine controller in electrical communication with the VGT actuator, the EGR actuator, the first sensor, and the second sensor. The second sensor is a virtual sensor. The engine controller is configured to close the vanes of the VGT to provide air mass flow increase when backpressure is increasing, and stop closing the vanes of the VGT when a decrease in rate of change of air mass flow is determined.

Further, according to the present invention, a controller for controlling exhaust gas particulate emissions from a compression ignition internal combustion engine is provided. The controller comprises a first output port, a second output port, first input port, and a second input port. The first output port presents a first control signal to a variable geometry turbocharger (VGT) installed on the engine and an actuator is configured to continuously adjust turbine vanes in the VGT in real-time in response to the first control signal. The second output port presents a second control signal to an exhaust gas recirculation (EGR) valve installed on the engine and an actuator is configured to continuously adjust the EGR valve in real-time in response to the second control signal. The first input port receives a first sensor signal from a respective sensor for determining backpressure across the engine. The second input port receives a second sensor signal from a respective sensor for determining air mass flow into the engine. The sensor for determining air mass flow into the engine is a virtual sensor. The controller is in electrical communication with the VGT actuator, the EGR actuator, the sensor for determining backpressure across the engine, and the sensor for determining air mass flow into the engine. The engine controller controls closing the vanes of the VGT to provide air mass flow increase when backpressure is increasing, and stops closing the vanes of the VGT when a decrease in rate of change of air mass flow is determined.

If the improvement in air flow due to vane closure does not meet the air flow target, then the EGR rate is reduced to compensate for the increase in back pressure. The amount of EGR rate reduction could vary depending on the speed and load. The increase in backpressure reduces NOx and will out weigh the NOx increase due to EGR rate reduction. Thus the objective of maintaining similar emissions is achieved. The injection timing and the Nozzle Opening Pressure (NOP) could also be changed to compensate for the loss of airflow.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
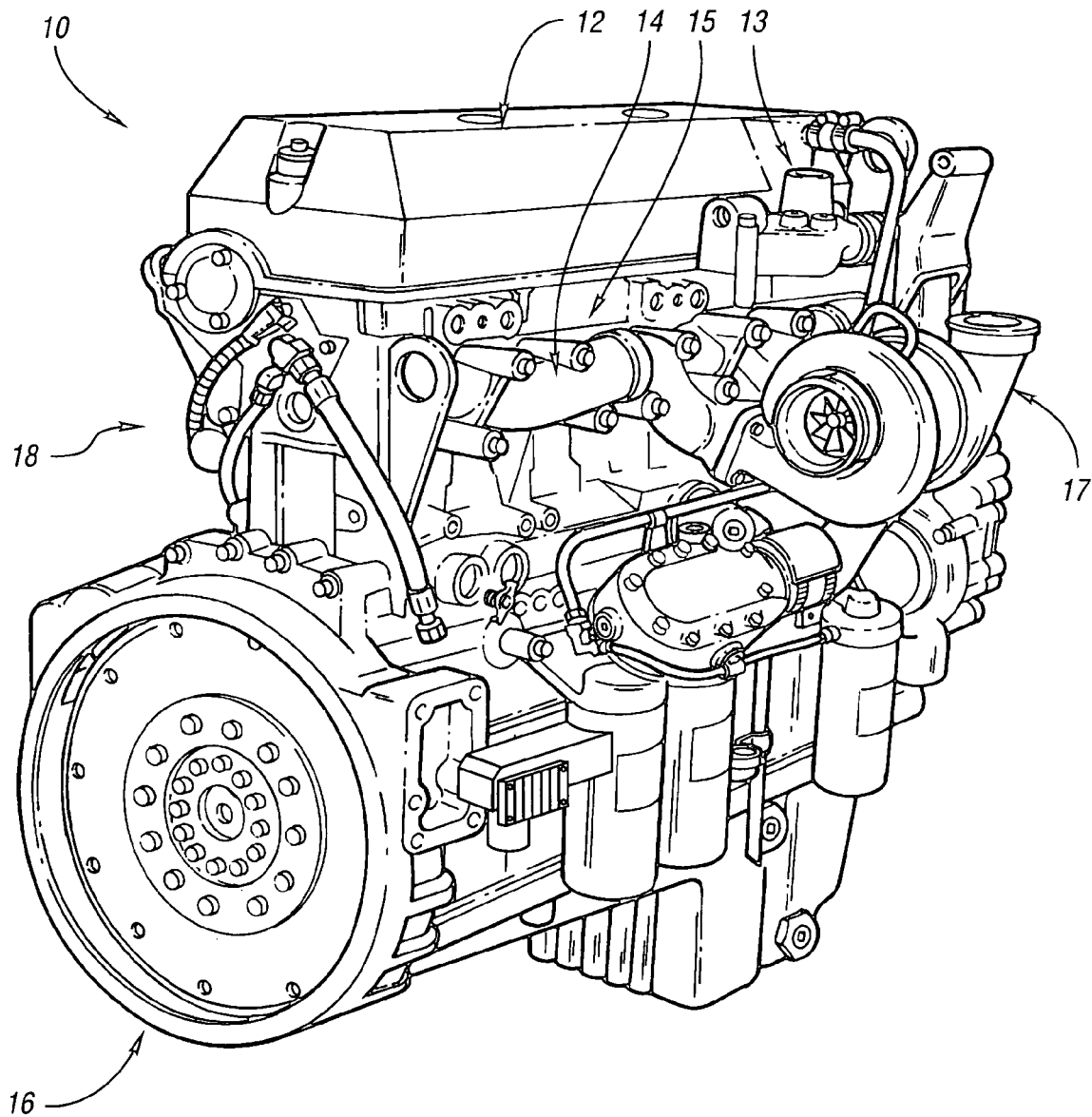
FIG. 1 is a diagram illustrating a compression ignition engine incorporating various features of the present invention.

With reference to the Figures, the preferred embodiments of the present invention will now be described in detail. Generally, the present invention provides an improved system and an improved method for continuously controlling exhaust gas particulate emissions from a compression ignition internal combustion engine. The present invention generally implements continuous backpressure compensation present invention generally provides for calibrating limits on the amount of air flow increase and the amount of exhaust gas recirculation (EGR) flow decrease to provide substantially the same exhaust gas particulate emissions during steady state and transitional modes of operation of the engine.

The present invention is generally implemented in connection with an internal combustion engine (e.g., a compression ignition or diesel engine) having an EGR system, a variable geometry turbine turbocharger (VGT), and an exhaust system having a diesel particulate filter (DPF). An EGR system generally introduces a metered portion of the engine exhaust gases into the intake manifold. The EGR system generally dilutes the incoming air and fuel charge with the exhaust gases and lowers combustion temperatures to reduce the level of oxides of nitrogen.

To control or optimize at least one mode of the engine (e.g., an internal combustion engine in general and a compression ignition engine in particular) operation, VGT operation, and EGR operation where the respective operations are generally controlled by an electronic control module (ECM)/powertrain control module (PCM) or controller, the engine controller may be adaptable (i.e., programmable, modifiable, configurable, etc.) to a variety of input signals or parameters, for all operating (i.e., steady-state and transitional, idle, wide-open-throttle, partial throttle, highway speed, city traffic, etc.) conditions, continuously, and in real-time.

Exhaust back pressure may be affected by engine components other than emission control devices. For example, exhaust back pressure may be controlled to achieve a desired EGR flow using a turbocharger, such as a variable geometry turbocharger (VGT).

When backpressure is not properly controlled, the deficiencies noted in the Background can occur. In particular, it may be desirable to provide compensation for backpressure across the engine when there is a decrease in air flow through the engine. The present invention generally implements at least one pressure sensor or pressure sensing system (e.g., a backpressure sensor, a differential pressure sensor, an absolute pressure sensor, and the like) to monitor at least one across of backpressure across the engine and pressure drop across the DPF.

The system and method of the present invention generally includes closing the VGT vanes to provide for an air mass flow increase when there is an increase in backpressure, and determining when there is a positive rate of change in air mass flow to provide for the prevention of over-closing the VGT vanes. The system and method of the present invention generally includes stopping closing the VGT vanes when a decrease in air mass flow is determined in connection with the closing of the VGT vanes. The system and method of the present invention generally compensates for backpressure in response to the positive rate of change in air mass flow in connection with closing the VGT vanes.

The system and method of the present invention generally increases a mass air flow request (e.g., control signal) linearly in response to an increase in backpressure. Desired EGR flow is generally decrease linearly and proportionally to the mass air flow request to provide for the reduction or elimination of black exhaust smoke and soot accumulation across the DPF. Limits on the amount of increase in air flow and in the amount of decrease in EGR flow are generally calibratable (e.g., predetermined) using a controller to provide substantially the same emissions during normal engine modes of operation and during high backpressure modes of engine operation.

The system and method of the present invention may further provide for including controlling engine injection timing to provide backpressure control and compensation. The system and method of the present invention may yet further provide for including real-time determination (e.g., calculation) of NOx emissions and providing for continuous backpressure control and compensation in response to the real-time determination of NOx emissions. The system and method of the present invention generally provide for appropriate signal filtering and tuning (e.g., including hysteresis) to reduce or eliminate undesirable transitions between modes of operation of the backpressure control and compensation (e.g., transitions generated during changes of modes of operation of the engine where the system and method of the present invention are implemented).

Referring to FIG. 1, a perspective view illustrating a compression-ignition internal combustion engine 10 incorporating various features according to the present invention is shown. The engine 10 may be implemented in a wide variety of applications including on-highway trucks, construction equipment, marine vessels, stationary generators, pumping stations, and the like. The engine 10 generally includes a plurality of cylinders disposed below a corresponding cover, indicated generally by reference numeral 12.

In a preferred embodiment, the engine 10 is a multi-cylinder compression ignition internal combustion engine, such as a 3, 4, 6, 8, 12, 16, or 24 cylinder diesel engine. However, the engine 10 may be implemented having any appropriate number of cylinders 12, the cylinders having any appropriate displacement and compression ratio to meet the design criteria of a particular application. Moreover, the present invention is not limited to a particular type of engine or fuel. The present invention may be implemented in connection with any appropriate engine (e.g., Otto cycle, Rankine cycle, Miller cycle, etc.) using an appropriate fuel to meet the design criteria of a particular application.

An EGR valve 13 is generally connected between an exhaust manifold 14 and an intake manifold 15. The EGR valve 13 generally provides recirculation of a portion of exhaust gas in response to at least one predetermined engine 10 operating condition (e.g., a time in EGR, a load presented to the engine, a position of turbocharger turbine vanes, changing of position, i.e., opening and closing of turbocharger turbine vanes, etc.). The EGR valve 13 is generally implemented as a variable flow device. The EGR valve 13 generally includes an actuator that opens and closes the EGR valve an amount (i.e., level, to a position, etc.) that corresponds to (i.e., in response to) a control signal (e.g., ACT), and a sensor that generates a position signal (e.g., POSIT) that corresponds to (i.e., in response to) the amount of opening (or closing) of the EGR valve.

A turbocharger 17 may be installed in the engine 10 exhaust stream and may provide pressurized air to the intake manifold 15. The turbocharger 17 may be implemented as a variable geometry device (VGT, also called a variable gate turbocharger, and also called variable turbine geometry (VTG)). The VGT turbocharger 17 generally has movable turbine vanes that pivot to adjust boost pressure in response to engine speed and load. Cross-sectional changes are made by resetting the turbine blades (e.g., smaller contact surface at low speeds, larger contact surface at high speeds). VTG turbochargers such as the VGT 17 may be particularly efficient at partial load and generally reduce or eliminate "turbo lag". VTG turbochargers can increase effective engine power, increase throttle response and can also have a beneficial effect on particulate emissions. The VGT 17 generally includes an actuator that opens and closes the VGT turbine vanes an amount (i.e., level, to a position, etc.) that corresponds to (i.e., in response to) a control signal (e.g., ADJ), and a sensor that generates a position signal (e.g., VAPOS) that corresponds to (i.e., in response to) the amount of opening of the VGT turbine vanes.

The engine 10 generally includes an engine control module (ECM), powertrain control module (PCM), or other appropriate controller 32 (shown and described in detail in connection with FIG. 2). The ECM 32 generally communicates with various engine sensors and actuators via associated interconnection cabling (i.e., leads, wires, connectors, etc.) 18, to control the engine 10 and at least one of the EGR valve 13 and the VGT 17. In addition, the ECM 32 generally communicates with an engine operator or user (not shown) using associated lights, switches, displays, and the like (not shown).

In one example, the engine 10 may be mounted (i.e., installed, implemented, positioned, disposed, etc.) in a vehicle (not shown). In another example, the engine 10 may be installed in a stationary environment. The engine 10 may be coupled to a transmission (not shown) via flywheel 16. Many transmissions include a power take-off (PTO) configuration where an auxiliary shaft (not shown) may be connected to associated auxiliary equipment (not shown). However, the present invention is independent of the particular operation mode of the engine 10, or whether the vehicle is stationary or moving for the applications in which the engine 10 is used in a vehicle having a PTO mode. The loads presented to the engine 10/transmission in a stationary configuration may be relatively constant or may vary.

Figure 2:
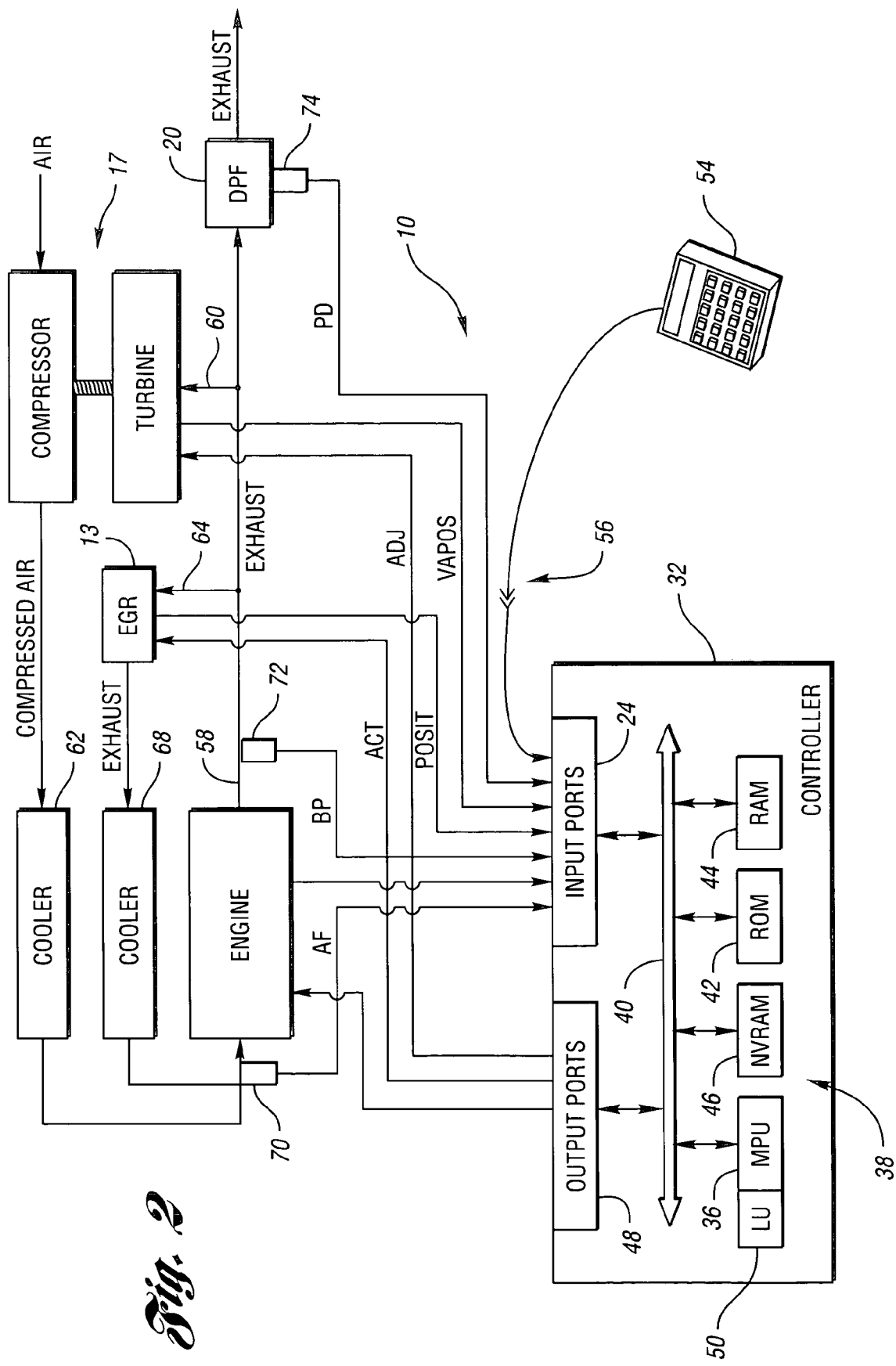
FIG. 2 is a schematic diagram of an internal combustion engine and engine control system of the present invention.

Referring to FIG. 2, the internal combustion engine 10 and associated control system (or controller) 32 and subsystems are shown. Various sensors and switches (not shown) are generally in electrical communication with (i.e., are connected or coupled to) the controller 32 via input ports 24. The sensors may include various position sensors such as an accelerator or brake position sensor. Likewise, the sensors may include a coolant temperature sensor that generally provides an indication of the temperature of an engine block and an intake manifold air temperature sensor that generally provides an indication of the temperature of the engine intake air at the inlet or within the intake manifold 15.

Likewise, an oil pressure sensor may be used to monitor the engine 10 operating conditions by providing an appropriate signal to the controller 32. Other sensors may include at least one sensor that indicates actuation (e.g., position, percentage of open, etc.) of the EGR control valve 13 (e.g., via the signal POSIT), at least one sensor that indicates actuation of the VGT 17 (e.g., via the signal VAPOS), at least one sensor that indicates actuation of at least one cooling fan, and at least one sensor that indicates rotational speed of the at least one cooling fan.

The engine 10 generally has an exhaust output that present a portion of exhaust 58 (e.g., a portion 60) to the VGT 17 and the remainder of the exhaust gas through an exhaust system that includes a diesel particulate filter (DPF) 20.

In one example, an air flow mass (or mass air flow) sensor 70 may be implemented to provide an indication of the air flow through the engine 10 (e.g., via a signal AF). The sensor 70 is generally placed in the incoming air stream to the engine 10. The air flow sensor 70 generally presents a signal (e.g., via the signal AF) that is representative of the air mass flow to a respective input port 24.

In another example, the signal AF (i.e., the signal the corresponds to the air mass flow into the engine 10) may be generated using a virtual sensor. The controller 32 may dynamically determine an appropriate value (i.e., a virtual sensor signal value) for the signal AF in real time in response to engine operating conditions as determined using signals generated by the sensors coupled to the input ports 24 as described herein. In particular, engine intake mass air flow may be directly proportional to engine RPM and intake manifold pressure and indirectly proportional to intake manifold temperature. As such, sensor signals that correspond to engine RPM, intake manifold pressure, and intake manifold temperature may be used to generate (e.g., calculate, determine, etc.) the virtual sensor signal AF. However, an appropriate virtual sensor may be determined using any appropriate parameters to meet the design criteria of a particular application.

According to the present invention, an exhaust back pressure sensor (EBS) 72 may be implemented for monitoring (e.g., measuring, determining, etc.) exhaust back pressure. The sensor 72 may be placed directly in the exhaust or fluidly coupled to the exhaust. The EBS 72 generally presents a signal (e.g., BP) that is representative of the exhaust backpressure to a respective input port 24.

A pressure sensor 74 may be implemented to monitor the pressure across the DPF 20. The sensor 74 generally presents a signal (e.g., PD) that is representative of the pressure across the DPF 20 to a respective input port 24.

Other sensors may include rotational sensors to detect the rotational speed of the engine 10, such as an RPM sensor and a vehicle speed sensor (VSS) in some applications. The VSS generally provides an indication of the rotational speed of the output shaft or tailshaft (not shown) of the transmission. The speed of the shaft monitored via the VSS may be used to calculate the vehicle speed. The VSS may also represent one or more wheel speed sensors which may be used in anti-lock breaking system (ABS) applications, vehicle stability control systems, and the like.

The controller 32 preferably comprises a programmable microprocessor 36 in communication with (i.e., coupled to) various computer readable storage media 38 via at least one data and control bus 40. The computer readable storage media 38 may include any of a number of devices such as read only memory (ROM) 42, random access memory (RAM) 44, and non-volatile (keep-alive) random access memory (NVRAM) 46.

The various types of computer-readable storage media 38 generally provide short-term and long-term storage of data (e.g., at least one lookup table, LUT, at least one operation control routine, at least one mathematical model for EGR control, etc.) used by the controller 32 to control the engine 10 and the EGR valve 13. The computer-readable storage media 38 may be implemented by any of a number of known physical devices capable of storing data representing instructions executable by the microprocessor 36. Such devices may include PROM, EPROM, EEPROM, flash memory, and the like in addition to various magnetic, optical, and combination media capable of temporary and permanent data storage.

The computer-readable storage media 38 may include data representing program instructions (e.g., software), calibrations, routines, steps, methods, blocks, operations, operating variables, and the like used in connection with associated hardware to control the various systems and subsystems of the engine 10, the EGR valve 13, the VGT 17, and the vehicle. The engine/vehicle/EGR system control logic is generally implemented via the controller 32 based on the data stored in the computer-readable storage media 38 in addition to various other electric and electronic circuits (i.e., hardware, firmware, etc.).

The computer readable storage media 38 generally have instructions stored thereon that may be executable by the controller 32 to control the internal combustion engine 10, including the EGR valve 13 and a variable geometry device (e.g., turbine vanes) on the turbocharger 17, and to determine the level of the virtual sensor signal AF. The program instructions may direct the controller 32 to control the various systems and subsystems of the vehicle where the engine 10 is implemented, with the instructions being executed by microprocessor 36, and optionally, instructions may also be executed by any number of logic units 50. The input ports 24 may receive signals from the various sensors and switches, and the controller 32 may generate signals (e.g., the signals ACT and ADJ) at output ports 48. The output signals are generally presented (or transmitted) to the various vehicle components (e.g., the EGR valve 13 actuator, the VGT 17 actuator, other actuators, indicators, and the like).

The actuators may include various engine components which are operated via associated control signals from the controller 32. The various actuators may also provide signal feedback to the controller 32 relative to the actuator operational state (e.g., via a respective sensor), in addition to feedback position or other signals used control to the actuators. The actuators preferably include a plurality of fuel injectors which are controlled via associated (or respective) solenoids to deliver fuel to the corresponding cylinders 12. The actuators may include at least one actuator that may be implemented to control the EGR valve 13 in response to the signal ACT, and at least one actuator to control the turbine vanes (i.e., vary the geometry of) of the VGT 17 in response to the signal ADJ.

A data, diagnostics, and programming interface 54 may also be selectively connected to the controller 32 via a bus and connector 56 to exchange various information therebetween. The interface 54 may be used to change values within the computer readable storage media 38, such as configuration settings, calibration variables, instructions for EGR and engine control, at least one constant that corresponds to the EGR valve 13 geometry, at least one constant that corresponds to the VGT 17, and the like.

As used throughout the description of the present invention, at least one selectable (i.e., programmable, predetermined, modifiable, etc.) constant, limit, set of calibration instructions, calibration values (i.e., threshold, level, interval, value, amount, duration, etc.) or range of values may be selected by any of a number of individuals (i.e., users, operators, owners, drivers, etc.) via a programming device, such as the device 54 selectively connected via an appropriate plug or connector 56 to the controller 32.

Rather than being primarily controlled by software, the selectable or programmable constant and limit (or range) values may also be provided by an appropriate hardware circuit having various switches, dials, and the like. Alternatively, the selectable or programmable limit and range may also be changed using a combination of software and hardware without departing from the spirit of the present invention. However, the at least one selectable value or range may be predetermined and/or modified by any appropriate apparatus and method to meet the design criteria of a particular application. Any appropriate number and type of sensors, indicators, actuators, etc. may be implemented to meet the design criteria of a particular application.

In at least one mode of operation, the controller 32 may receive signals from the various vehicle sensors and switches, and execute control logic embedded in hardware and software to control the engine 10, the EGR valve 13, the VGT 17, and the like. One or more of the sensors (e.g., the engine inlet air mass flow sensor 70) may be virtual sensors using control logic embedded in hardware and software. In one example, the controller 32 is implemented as at least one implementation of a DDEC controller available from Detroit Diesel Corporation, Detroit, Michigan. Various other features of the DDEC controller are described in detail in a number of different U.S. patents assigned to Detroit Diesel Corporation. However, the present invention may be implemented in connection with any appropriate controller to meet the design criteria of a particular application.

Control logic may be implemented in hardware, firmware, software, or combinations thereof. Further, control logic may be executed by the controller 32, in addition to and by any of the various systems and subsystems of the vehicle or other installation where the controller 32 is implemented. Yet further, although in a preferred embodiment, the controller 32 includes the microprocessor 36, any of a number of known programming and processing techniques, algorithms, steps, bocks, processes, routines, strategies and the like may be implemented to control the engine 10, the EGR valve 13, the VGT 17, and simulate the virtual sensor 70 in accordance with the present invention. Further, the engine controller 32 may receive information in a variety of ways. For example, engine 10 systems information may be received over a data link, at a digital input, or at a sensor input of the engine controller 32.

The controller 32 generally provides enhanced engine performance by controlling the variable flow EGR valve 13 and the VGT 17. The amount of exhaust gas to be recirculated is generally controlled by the EGR valve 13. In accordance with the present invention, the EGR valve 13 comprises a variable flow valve that is electronically controlled by the controller 32. There may be many possible configurations for a controllable EGR valve, and embodiments of the present invention are not limited to any particular structure for the EGR valve 13. Further, various sensors located at the EGR valve 13, on the engine 10, and in connection with corresponding systems, subsystems, and components may detect temperature and differential pressure to provide for determination of the exhaust gas mass flow rate through the EGR valve 13 via the controller 32.

In addition, various sensor configurations may be implemented in various parts of the exhaust flow paths of the engine 10 to provide the controller 32 with appropriate signals to determine the various respective mass flow rates throughout the exhaust system (e.g., exhaust gas flow 58 from the exhaust manifold 14), including flow through the EGR system (e.g., flow 64) and flow through the turbocharger 17 compressor (e.g., flow 60), and any other flows to meet the design criteria of a particular application.

In particular, sensors are generally implemented to provide signals to respective input ports 24 that correspond to (or relate to) EGR 13 valve and actuator position, intake manifold 15 air pressure, exhaust manifold 14 exhaust gas pressure, turbocharger 17 compressor inlet air temperature, turbocharger 17 compressor inlet air pressure, a physical or virtual sensor 70 that presents a signal (e.g., the signal AF) that corresponds to air mass flow through the engine 10, the sensor 72 that presents a signal (e.g., the signal BP) that corresponds to exhaust (i.e., engine) backpressure, and the sensor 74 that presents a signal (e.g., the signal PD) that corresponds to pressure across the DPF 20.

In at least one example, a cooler 62 may be implemented to cool the charge (i.e., compressed) air coming from the turbocharger 17. Similarly, in at least one example, a cooler 68 may be implemented to cool the exhaust gas flow from the EGR valve 13 to the intake manifold 15 through the EGR system prior to reintroduction to engine 10.

Embodiments of the present invention include control logic that processes various input signals representing various engine (or component, system, subsystem, etc.) conditions, and in turn, provides at least one EGR command (or control) signal (e.g., ACT) and at least one VGT control signal (e.g., ADJ). The EGR command (or control) signal ACT generally controls a position of the variable flow EGR valve 13 to control gas flow through the EGR exhaust gas flow path 64. The EGR position sensor generally presents a signal (e.g., POSIT) to at least one of the input ports 24. The position signal POSIT generally corresponds to (i.e., is related to) the position (e.g., percentage of opening or closing) of the EGR valve 13. The VGT control signal ADJ generally controls a position of the variable vane turbocharger 17 turbine vanes to control flow through the VGT exhaust gas flow path 60. The VGT position sensor generally presents a signal (e.g., VAPOS) to at least one of the input ports 24. The position signal VAPOS generally corresponds to the position of the VGT 17 turbine vanes.

In one embodiment, the controller 32 controls various components such as a fuel pump to transfer fuel from a source to a common fuel rail or manifold. However, in another example, the present invention may be implemented in connection with a direct injection engine. Operation of solenoids generally controls delivery of the timing and duration of fuel injection (i.e., an amount, timing and duration of fuel). While the representative engine and control system 10 illustrates an example application environment of the present invention, as noted previously the present invention is not limited to any particular type of fuel or fueling system and thus may be implemented in any appropriate engine and/or engine system to meet the design criteria of a particular application.

The sensors, switches and actuators may be implemented to communicate status and control information to the engine operator via a console (not shown). The console may include various switches in addition to indicators. The console is preferably positioned in close proximity to the engine operator, such as in a cab (i.e., passenger compartment, cabin, etc.) of the vehicle (or environment) where the system 10 is implemented. The indicators may include any of a number of audio and visual indicators such as lights, displays, buzzers, alarms, and the like. Preferably, one or more switches may be used to request at least one particular operating mode, such as climate control (e.g., air conditioning), cruise control or PTO mode, for example.

In one example, the controller 32 includes control logic to control at least one mode of operation of the engine 10 and at least one mode of operation of the EGR 13 valve and actuator system, and the VGT 17 vane and actuator system. In another example, the controller 32 may be implemented as an EGR controller and engine control may be performed via another controller (not shown). Modes of engine 10 operation that may be controlled include engine idle, PTO operation, engine shutdown, maximum permitted vehicle speed, maximum permitted engine speed (i.e., maximum engine RPM), whether the engine 10 may be started (i.e., engine start enable/disable), engine operation parameters that affect engine emissions (e.g., timing, amount and duration of fuel injection, EGR control, VGT control, exhaust air pump operation, etc.), cruise control enable/disable, seasonal shutdowns, calibration modifications, and the like.

The signal POSIT generally provides a real-time EGR valve 13 position indication that may be integrated (e.g., combined, processed, etc.) with EGR flow dynamics and VGT 17 operation. The signal AF generally provides a real-time engine 10 air mass flow indication that may be integrated (e.g., combined, processed, etc.) with EGR flow dynamics and VGT 17 operation. The signal VAPOS generally provides a real-time VGT 17 turbine vane position indication that may be integrated (e.g., combined, processed, etc.) with EGR flow dynamics and VGT 17 operation.

The controller 32 (e.g., the microprocessor 46 and the memory 38) may be programmed with at least one mathematical model that may continuously capture (i.e., monitor) EGR flow dynamics, VGT 17 vane position, engine 10 backpressure, and pressure drop across the DPF 20 (via a number of input signals presented by sensors to the respective input ports 24). The controller 32 may continuously generate the real-time EGR valve 13 control signal ACT and the VGT 17 control signal ADJ to continuously adjust (i.e., set, modify, control, select, etc.) the EGR valve 13 position (or opening) and the VGT 17 turbine vane position (i.e., VGT geometry), respectively, in real-time.

That is, a desired change for EGR valve discharge coefficient plus the EGR valve discharge coefficient continuously generates an EGR actuator position control signal (e.g., the signal ACT). The value (i.e., amount, level, etc.) that is determined (i.e., calculated, set, etc.) for the signal ACT generally integrates (e.g., combines, processes, etc.) the EGR valve 13 position feedback, EGR valve actuator delay, intake air and exhaust gas flow dynamics (e.g., delays) in connection with EGR valve discharge coefficient relationships as determined in response to the EGR valve 13 position (i.e., the signal POSIT).

The present invention generally provides for controlling exhaust gas particulate emissions from a compression ignition internal combustion engine (e.g., the engine 10) having a variable geometry turbocharger (e.g., the VGT 17) by determining backpressure across the engine and air mass flow into the engine, closing vanes of the VGT to provide air mass flow increase when backpressure is increasing, and stopping the step of closing the vanes of the VGT when a decrease in rate of change of air mass flow is determined.

The controller 32 generally control closing the vanes of the VGT 17 such that the air mass flow through the engine 10 is increased linearly, and a decrease in EGR flow is controlled proportionally to the air mass flow increase.

The controller 32 generally provides calibrating limits on the amount of air flow increase and the amount of EGR flow decrease to provide substantially the same exhaust gas particulate emissions during steady state and transitional modes of operation of the engine 10.

The controller 32 generally determines rate of change of the air mass flow, and prevents overclosure of the VGT 17 vanes by stopping the closing of the vanes of the VGT 17 when a positive rate of change of the air mass flow occurs.

The controller 32 generally determines engine NOx emissions, and controls the position of the VGT 17 vanes in response to the engine NOx emissions The controller 32 generally determines engine 10 injection timing, and controls the position of the VGT 17 vanes in response to the engine injection timing.

The controller 32 may monitor backpressure across the DPF 20 (e.g., receive and monitor the signal PD), and control the position of the VGT 17 vanes in response to the backpressure across the DPF (i.e., in response to the signal PD).

The controller 32 may provide hysteresis (i.e., the lagging or retardation of an effect behind its cause) to control of the position of the VGT 17 vanes to minimize VGT 17 vane opening and closing transitions. The hysteresis may include at least one of providing a predetermined time of operation at any mode prior to the transition to another mode, and determining a change in the level of any of the signals AF, BP and PD by respective predetermined amounts prior to presenting the signal ADJ.

As is readily apparent from the foregoing description, then, the present invention generally provides an improved apparatus and an improved method for controlling exhaust gas particulate emissions from a compression ignition internal combustion engine. The improved system and method for exhaust gas particulate emissions control of the present invention may provide improved drivability and fuel economy when compared to conventional approaches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling exhaust gas particulate emissions from a compression ignition internal combustion engine having a variable geometry turbocharger (VGT), the method comprising the steps of:
   determining backpressure across the engine and air mass flow into the engine;
   closing vanes of the VGT to provide air mass flow increase when backpressure is increasing; and
   stopping the step of closing the vanes of the VGT when a decrease in rate of change of air mass flow is determined.

2. The method of claim 1 wherein the engine includes exhaust gas recirculation (EGR) and the method further comprises controlling closing the vanes of the VGT such that the air mass flow is increased linearly and controlling a decrease in EGR flow proportional to the air mass flow increase.

3. The method of claim 2 further comprising calibrating limits on the amount of air flow increase and the amount of EGR flow decrease to provide substantially the same exhaust gas particulate emissions during steady state and transitional modes of operation of the engine.

4. The method of claim 1 further comprising determining rate of change of the air mass flow, and preventing overclosure of the VGT vanes by stopping the step of closing the vanes of the VGT when a positive rate of change of the air mass flow occurs.

5. The method of claim 1 further comprising determining engine NOx emissions, and controlling the position of the VGT vanes in response to the engine NOx emissions.

6. The method of claim 1 further comprising determining engine injection timing, and controlling the position of the VGT vanes in response to the engine injection timing.

7. The method of claim 1 further comprising monitoring backpressure across a diesel particulate filter (DPF), and controlling the position of the VGT vanes in response to the backpressure across the DPF.

8. The method of claim 1 further comprising including hysteresis to controlling the position of the VGT vanes to minimize VGT vane opening and closing transitions.

9. A system for controlling exhaust gas particulate emissions from a compression ignition internal combustion engine, the system comprising:
   a variable geometry turbocharger (VGT) installed on the engine and having an actuator configured to continuously adjust turbine vanes in the VGT in real-time in response to a VGT control signal;
   an exhaust gas recirculation (EGR) valve installed on the engine and having an actuator configured to continuously adjust the EGR valve in real-time in response to an EGR control signal;
   a first sensor for determining backpressure across the engine;
   a second sensor for determining air mass flow into the engine, wherein the sensor for determining air mass flow into the engine is a virtual sensor; and
   an engine controller in electrical communication with the VGT actuator, the EGR actuator, the first sensor, and the second sensor, the engine controller configured to close the vanes of the VGT to provide air mass flow increase when backpressure is increasing, and stop closing the vanes of the VGT when a decrease in rate of change of air mass flow is determined.

10. The system of claim 9 wherein the second sensor generates an engine intake mass air flow signal that comprises a value directly proportional to engine RPM and intake manifold pressure, and indirectly proportional to intake manifold temperature.

11. The system of claim 9 wherein the controller further comprises a microprocessor and media that are programmed with at least one mathematical model to determine the VGT control signal and the EGR control signal.

12. The system of claim 9 wherein the controller controls closing the vanes of the VGT such that the air mass flow is increased linearly and controls a decrease in EGR flow proportional to the air mass flow increase.

13. The system of claim 12 wherein the controller determines calibration limits on the amount of air flow increase and the amount of EGR flow decrease to provide substantially the same exhaust gas particulate emissions during steady state and transitional modes of operation of the engine.

14. The system of claim 9 wherein the controller determines rate of change of the air mass flow, and prevents overclosure of the VGT vanes by stopping the step of closing the vanes of the VGT when a positive rate of change of the air mass flow occurs.

15. The system of claim 9 wherein the controller determines engine NOx emissions, and controls the position of the VGT vanes in response to the engine NOx emissions.

16. The system of claim 9 wherein the controller determines engine injection timing and controls the position of the VGT vanes in response to the engine injection timing.

17. The system of claim 9 wherein the controller monitors backpressure across a diesel particulate filter (DPF), and controls the position of the VGT vanes in response to the backpressure across the DPF.

18. The system of claim 9 wherein the controller includes hysteresis to control the position of the VGT vanes such that VGT vane opening and closing transitions are minimized.

19. A controller for controlling exhaust gas particulate emissions from a compression ignition internal combustion engine, the controller comprising:
 a first output port that presents a first control signal to a variable geometry turbocharger (VGT) installed on the engine and having an actuator configured to continuously adjust turbine vanes in the VGT in real-time in response to the first control signal;
 a second output port that presents a second control signal to an exhaust gas recirculation (EGR) valve installed on the engine and having an actuator configured to continuously adjust the EGR valve in real-time in response to the second control signal;
 a first input port that receives a first sensor signal from a respective sensor for determining backpressure across the engine; and
 a second input port that receives a second sensor signal from a respective sensor for determining air mass flow into the engine, wherein the sensor for determining air mass flow into the engine is a virtual sensor and the second sensor signal comprises a value directly proportional to engine RPM and intake manifold pressure, and indirectly proportional to intake manifold temperature, the controller is in electrical communication with the VGT actuator, the EGR actuator, the sensor for determining backpressure across the engine, and the sensor for determining air mass flow into the engine, and the engine controller controls closing the vanes of the VGT to provide air mass flow increase when backpressure is increasing, and stops closing the vanes of the VGT when a decrease in rate of change of air mass flow is determined.

20. The controller of claim 19 wherein the controller controls closing the vanes of the VGT such that the air mass flow is increased linearly and controls a decrease in EGR flow proportional to the air mass flow increase, and determines rate of change of the air mass flow, and prevents overclosure of the VGT vanes by stopping the closing the vanes of the VGT when a positive rate of change of the air mass flow occurs.

\* \* \* \* \*